(12) United States Patent
Toda et al.

(10) Patent No.: US 11,850,933 B2
(45) Date of Patent: Dec. 26, 2023

(54) VEHICLE BODY STRUCTURE

(71) Applicant: MAZDA MOTOR CORPORATION, Hiroshima (JP)

(72) Inventors: Isao Toda, Hiroshima (JP); Takayuki Kimura, Hiroshima (JP); Takehiro Kamei, Hiroshima (JP); Hiroshi Tanaka, Hiroshima (JP); Haruo Ohe, Hiroshima (JP); Masaya Hiramatsu, Hiroshima (JP); Masanobu Fukushima, Hiroshima (JP); Takao Fukuda, Hiroshima (JP); Hironobu Hashiguchi, Hiroshima (JP); Hiroyuki Baba, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 220 days.

(21) Appl. No.: 17/649,010

(22) Filed: Jan. 26, 2022

(65) Prior Publication Data

US 2022/0314774 A1    Oct. 6, 2022

(30) Foreign Application Priority Data

Mar. 30, 2021   (JP) .................................. 2021-057827

(51) Int. Cl.
*B60K 1/04*     (2019.01)
*B60N 2/015*    (2006.01)
*B62D 25/20*    (2006.01)

(52) U.S. Cl.
CPC ................. *B60K 1/04* (2013.01); *B60N 2/015* (2013.01); *B62D 25/2036* (2013.01); *B60K 2001/0433* (2013.01); *B60K 2001/0438* (2013.01)

(58) Field of Classification Search
CPC .............. B60K 1/04; B60K 2001/0411; B60K 2001/0422; B60K 2001/0427; B60K 2001/0433; B60K 2001/0438; B60N 2/005; B60N 2/015; B62D 25/2036; B62D 25/20
See application file for complete search history.

(56) References Cited

U.S. PATENT DOCUMENTS

| 4,216,839 | A  | * | 8/1980  | Gould ..................... | B60L 50/66 267/221 |
|---|---|---|---|---|---|
| 2009/0186266 | A1 | * | 7/2009 | Nishino .................. | B60L 50/66 429/120 |
| 2009/0197154 | A1 | * | 8/2009 | Takasaki ............. | H01M 10/625 429/83 |
| 2012/0006607 | A1 | * | 1/2012 | Ohashi .................... | B60L 58/40 180/65.31 |
| 2013/0174804 | A1 |   | 7/2013 | Matsuda | |
| 2014/0338999 | A1 | * | 11/2014 | Fujii ....................... | B60L 58/26 180/68.5 |

(Continued)

FOREIGN PATENT DOCUMENTS

| JP | 2005-178581 A | 7/2005 |
|---|---|---|
| JP | 2008-155829 A | 7/2008 |

(Continued)

*Primary Examiner* — Jeffrey J Restifo
(74) *Attorney, Agent, or Firm* — Studebaker & Brackett PC

(57) ABSTRACT

A vehicle body structure includes a front floor panel and a rear floor panel provided at the rear of the front floor panel. The front floor panel is positioned higher than the rear floor panel. A front battery that supplies electric power to the traction motor is arranged below the front floor panel.

11 Claims, 8 Drawing Sheets

(56) References Cited

U.S. PATENT DOCUMENTS

| | | | |
|---|---|---|---|
| 2017/0203668 A1* | 7/2017 | Enning | B60L 50/64 |
| 2017/0271727 A1* | 9/2017 | Ito | B60L 50/64 |
| 2018/0111483 A1* | 4/2018 | Nakayama | B60L 50/64 |
| 2018/0111500 A1* | 4/2018 | Ogaki | H01M 10/6568 |
| 2018/0244142 A1* | 8/2018 | Takayanagi | B62D 25/087 |
| 2018/0345778 A1* | 12/2018 | Yamanaka | B60K 1/04 |
| 2018/0345817 A1* | 12/2018 | Yamamoto | H01M 10/6568 |
| 2019/0009661 A1* | 1/2019 | Okamura | H01M 50/249 |
| 2019/0232773 A1* | 8/2019 | Kasai | B62D 21/157 |
| 2019/0263276 A1* | 8/2019 | Otoguro | B62D 25/20 |
| 2019/0276081 A1* | 9/2019 | Otoguro | B60K 1/04 |
| 2019/0291558 A1* | 9/2019 | Goto | H01M 50/209 |
| 2020/0343502 A1* | 10/2020 | Iwata | B60L 50/64 |
| 2020/0376947 A1* | 12/2020 | Yamada | B60K 1/04 |
| 2020/0376948 A1* | 12/2020 | Yamada | B62D 25/20 |
| 2021/0114448 A1* | 4/2021 | Meyer | H02K 9/197 |
| 2021/0300480 A1* | 9/2021 | Kohara | B60K 15/063 |
| 2022/0069405 A1* | 3/2022 | Choi | B60L 3/0007 |
| 2022/0185088 A1* | 6/2022 | Zhang | H01M 50/244 |
| 2022/0223960 A1* | 7/2022 | Boehm | B60K 1/04 |
| 2022/0231368 A1* | 7/2022 | Wang | H01M 50/262 |
| 2022/0281543 A1* | 9/2022 | Breu | B62D 25/087 |
| 2022/0297522 A1* | 9/2022 | Nicholls | B60L 50/66 |
| 2022/0314770 A1* | 10/2022 | Toda | B62D 25/2009 |
| 2022/0314771 A1* | 10/2022 | Toda | B60K 1/04 |
| 2022/0314774 A1* | 10/2022 | Toda | B60N 2/015 |
| 2022/0371419 A1* | 11/2022 | Fernandez-Galindo | B60K 1/04 |
| 2022/0379705 A1* | 12/2022 | Kamei | B62D 25/2036 |
| 2022/0379706 A1* | 12/2022 | Hiramatsu | B62D 21/11 |
| 2022/0379963 A1* | 12/2022 | Kamei | B62D 21/15 |
| 2022/0379966 A1* | 12/2022 | Kamei | B62D 25/025 |
| 2022/0388384 A1* | 12/2022 | Alwan | B60K 1/04 |
| 2022/0393268 A1* | 12/2022 | Marpu | H01M 10/6555 |
| 2023/0095674 A1* | 3/2023 | Inami | B60L 50/66 180/65.1 |

FOREIGN PATENT DOCUMENTS

| | | |
|---|---|---|
| JP | 2011-178289 A | 9/2011 |
| JP | 2019-018686 A | 2/2019 |

\* cited by examiner

FRONT ⟵⟶ REAR

VEHICLE BODY STRUCTURE

CROSS-REFERENCE TO RELATED APPLICATION

This application claims priority to Japanese Patent Application No. 2021-057827 filed on Mar. 30, 2021, the entire disclosure of which is incorporated by reference herein.

BACKGROUND

The present disclosure relates to a vehicle body structure including a floor panel, for example.

For example, in a motor vehicle having a traction motor, a battery unit for supplying electric power to the traction motor is mounted. Such a battery unit has a large capacity to extend the cruising range of the traction motor (e.g. see Japanese Unexamined Patent Publication No. 2019-18686). In the vehicle body structure of Japanese Unexamined Patent Publication No. 2019-18686, the battery unit is mounted below a floor panel extending horizontally from a front portion to a rear portion.

A vehicle body structure of Japanese Unexamined Patent Publication No. 2005-178581 includes a floor position adjuster that can adjust the height of a floor on which a leg of an occupant operating a pedal is placed. Japanese Unexamined Patent Publication No. 2005-178581 describes that, in general, the occupant is in an ergonomically comfortable state in a posture with a wide angle between an upper leg from the pelvis to a knee and a lower leg from a knee to an ankle while the seating position of the occupant is low. The floor position adjuster is provided to optimize this angle.

SUMMARY

According to inventor's study on the posture of the occupant upon pedal operation, it has found that, by raising a heel of the occupant operating the pedal to a position higher than a general position and lowering the hip point of the occupant, an angle between the lower leg and the floor becomes small and the pedal operability is improved accordingly. That is, the pedal operation in a vehicle is the operation of pushing the pedal forward of the vehicle, and at this point, the heel is placed on the floor in most cases. Thus, counterforce from the pedal acts on a foot sole, and counterforce from the floor mainly acts on the heel. In general, a pedal operation direction is not the horizontal direction but an obliquely-downward direction, and the small angle between the lower leg and the floor during the pedal operation results in small up-down component force input from the heel. This allows, e.g., the quick and accurate operation of switching the pedal to be stepped on from an accelerator pedal to a brake pedal or from the brake pedal to the accelerator pedal. As a result, the operability of the pedals is improved.

An approach for raising the position of the heel of the occupant operating a pedal is to provide the floor position adjuster of Japanese Unexamined Patent Publication No. 2005-178581. However, for providing such a floor position adjuster of Japanese Unexamined Patent Publication No. 2005-178581, there is a need for incorporating, into a vehicle body, a lifting/lowering mechanism for lifting/lowering the floor, a lock mechanism for locking the floor at a desired height, etc. For some vehicles, it is difficult to ensure a space for these mechanisms. Particularly, when an attempt is made to mount the battery unit below the floor panel as in Japanese Unexamined Patent Publication No. 2019-18686, the floor position adjuster of Japanese Unexamined Patent Publication No. 2005-178581 becomes an obstacle, and decreases the capacity for mounting batteries and therefore a cruising range.

In view of the foregoing background, it is an object of the present disclosure to increase the capacity for mounting batteries while improving pedal operability for an occupant operating a pedal.

To achieve the above-described object, a first aspect of the present disclosure may premise a vehicle body structure of a motor vehicle including a floor panel forming a floor surface of a vehicle interior in which a front seat is provided and a traction motor. The vehicle body structure includes a front floor panel for placing a heel of a pedal operator operating a pedal provided at the motor vehicle, and a rear floor panel provided at the rear of the front floor panel. The front floor panel is positioned higher than the rear floor panel. A front battery that supplies electric power to the traction motor is arranged below the front floor panel.

According to this configuration, the front floor panel for placing the heel of the pedal operator is positioned higher than the rear floor panel. Thus, the heel of the pedal operator is placed at a high position. This results in a small angle between a lower leg of the pedal operator and the front floor panel, which leads to small up-down component force input from the heel upon pedal operation. Thus, pedal operability is improved.

Moreover, the battery is arranged below the front floor panel arranged thereabove, and therefore, a space below the front floor panel can be effectively utilized as a space for arranging the battery without being a dead space.

A second aspect of the present disclosure includes a pair of right and left hinge pillars arranged to extend in an up-down direction at both end portions of the front floor panel in a vehicle width direction. Each hinge pillar and part of the front battery overlap with each other as viewed from the side of the vehicle body.

That is, the hinge pillar is a highly-rigid member because the hinge pillar supports a door in an openable/closable manner. Further, a lower end portion of the hinge pillar is positioned in the vicinity of the floor panel. For example, when an impact load acts laterally from the motor vehicle, the load is transmitted to the vehicle body through the highly-rigid hinge pillar. At this time, since the hinge pillar and part of the front battery overlap with each other as viewed from the side, the hinge pillar can protect the battery, and an input load on the battery can be reduced.

In a third aspect of the present disclosure, a rear portion of each hinge pillar is formed so as to be positioned rearward toward the lower side.

According to this configuration, an area where the lower portion of the hinge pillar and the battery overlap with each other as viewed from the side can be expanded. Thus, the input load on the battery when the impact load acts from the side of the motor vehicle can be further reduced.

In a fourth aspect of the present disclosure, the rear floor panel has a seat fixing portion for fixing the front seat.

According to this configuration, since the front seat is fixed to the rear floor panel positioned lower than the front floor panel, the hip point of the pedal operator seated on the front seat can be further lowered. This results in a much smaller angle between the lower leg of the pedal operator and the front floor panel.

A fifth aspect of the present disclosure further includes a rear-seat-side floor panel provided at a rear of the rear floor panel and fixed to a rear seat. The rear-seat-side floor panel is positioned higher than the rear floor panel. A rear battery that supplies electric power to the traction motor is arranged below the rear-seat-side floor panel.

According to this configuration, since the rear-seat-side floor panel is positioned higher, the field of view at the front of the occupant seated on the rear seat can be expanded. In this case, a space below the rear-seat-side floor panel can be effectively utilized as a space for arranging the battery. Thus, the capacity for mounting the battery can be further improved.

A sixth aspect of the present disclosure may premise a vehicle body structure of a motor vehicle including a floor panel forming a floor surface of a vehicle interior in which a front seat is provided and a traction motor. The floor panel includes a front panel portion for placing a heel of a pedal operator operating a pedal provided at the motor vehicle, and a rear panel portion provided at the rear of the front panel portion. The front panel portion is positioned higher than the rear panel portion. A front battery that supplies electric power to the traction motor is arranged below the front panel portion.

According to this configuration, one configured such that the floor panel is integrally formed from the front portion to the rear portion can provide features and advantages similar to those of the first aspect.

As described above, while the pedal operability is improved by the small angle between the lower leg of the pedal operator and the front floor panel, the space below the front floor panel is effectively used as the space for arranging the battery so that the capacity for mounting the battery can be increased.

DETAILED DESCRIPTION

An embodiment of the present disclosure will be described in detail below with reference to the drawings. Note that the following description of the preferred embodiment is only an example in nature, and is not intended to limit the scope, applications or use of the present disclosure.

Figure 1:
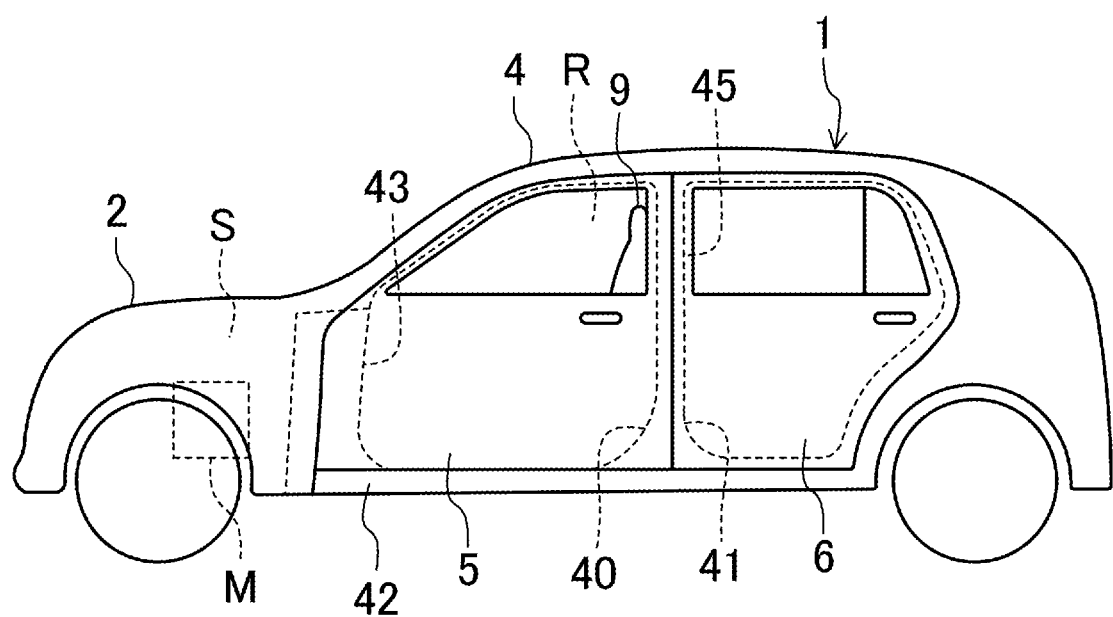
FIG. 1 is a side view of a motor vehicle of an embodiment of the present disclosure.

FIG. 1 is a left side view of a motor vehicle 1 of an embodiment of the present disclosure. The motor vehicle 1 is a so-called passenger car. Note that in the description of this embodiment, the front side of the vehicle is simply referred to as "front," the rear side of the vehicle is simply referred to as "rear," the right side of the vehicle is simply referred to as "right," and the left side of the vehicle is simply referred to as "left." A right-left direction of the vehicle is a vehicle width direction.

In a front portion of the motor vehicle 1, a power house S is provided. In the power house S, a power train (not shown) including a traction motor M etc. is stored. Thus, the power house S can also be referred to as, e.g., a power train storage compartment or a motor room. The motor vehicle 1 may be an electric motor vehicle or a hybrid motor vehicle (including a plug-in hybrid motor vehicle). In a case where the motor vehicle 1 is the electric motor vehicle, the traction motor M is mounted in the power house S. In a case where the motor vehicle 1 is the hybrid motor vehicle, the traction motor M and a not-shown internal combustion engine (an engine) are mounted in the power house S. Further, although not shown in the figure, the traction motor may be mounted at a rear portion of the motor vehicle 1, or may be an in-wheel motor mounted inside a wheel.

Provided above the power house S is a hood 2. The motor vehicle 1 may be such a front-engine rear-drive vehicle (hereinafter referred to as an FR vehicle) that an engine, a traction motor M, etc. mounted in a power house S drive rear wheels or such a front-engine front-drive vehicle (hereinafter referred to as an FF vehicle) that an engine, a traction motor M, etc. mounted in a power house S drive front wheels. In addition to the FR vehicle and FF vehicle, the motor vehicle may also be a 4-wheel drive vehicle that drives four wheels.

Figure 2:
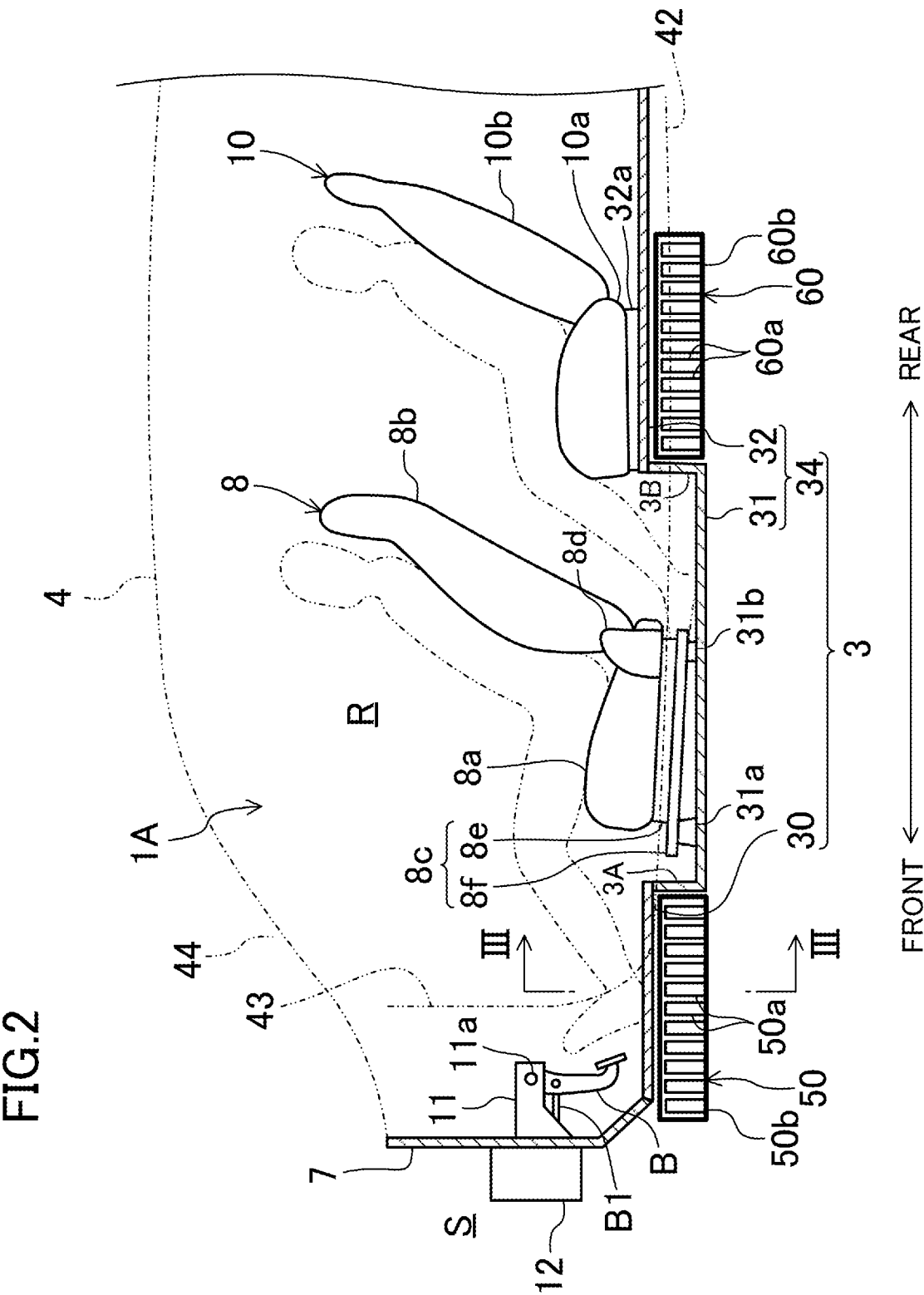
FIG. 2 is a partial cross-sectional view of a dash panel and a floor panel of the motor vehicle, FIG. 2 showing the position of a brake pedal.

In the motor vehicle 1, a vehicle interior R is provided at the rear of the power house S, as shown in FIG. 2. A bottom surface of the vehicle interior R is formed by a floor panel 3, and therefore, a space above the floor panel 3 is the vehicle interior R. A roof 4 is provided above the vehicle interior R. Further, as shown in FIG. 1, a front door 5 and a rear door 6 are arranged in an openable/closable manner at a left portion of the motor vehicle 1. Note that a front door and a rear door are also arranged in an openable/closable manner on the right side of the motor vehicle 1, although not shown in the figure.

As shown in FIG. 2, the motor vehicle 1 has a vehicle body structure 1A of the present disclosure. Although the vehicle body structure 1A includes the floor panel 3 and a dash panel 7, the dash panel 7 may be a member not forming the vehicle body structure 1A of the present disclosure. A member dividing the vehicle interior R and the power house S from each other in the front-rear direction is the dash panel 7. The dash panel 7 is made of, e.g., a steel plate, and extends not only in the right-left direction but also in the up-down direction. A lower portion of the dash panel 7 is inclined or curved so as to be positioned rearward toward a lower end portion thereof, and a lower end portion of the dash panel 7 is connected to a front end portion of the floor panel 3. Thus, the floor panel 3 is provided so as to extend rearward from the lower end portion of the dash panel 7.

In this embodiment, the right side of the vehicle interior R is a driver seat side, and the left side of the vehicle interior R is a passenger seat side. FIG. 2 is a cross-sectional view of the driver seat side of the motor vehicle 1, and shows the cross sections of the floor panel 3 and the dash panel 7 and a schematic structure of a driver seat 8 and a rear seat 10 attached to the floor panel 3 as well as a brake pedal B attached to the dash panel 7. While the driver seat 8 is provided on the right side of a center portion of the vehicle interior R in the right-left direction, a passenger seat 9 (shown in FIG. 1) is provided on the left side of the center portion of the vehicle interior R in the right-left direction. Note that the present disclosure is not limited to above, and the driver seat side may be on the left side of the vehicle interior R and the passenger seat side may be on the right side of the vehicle interior R. Further, there may be two or more rows of rear seats in the vehicle interior R.

Figure 3:
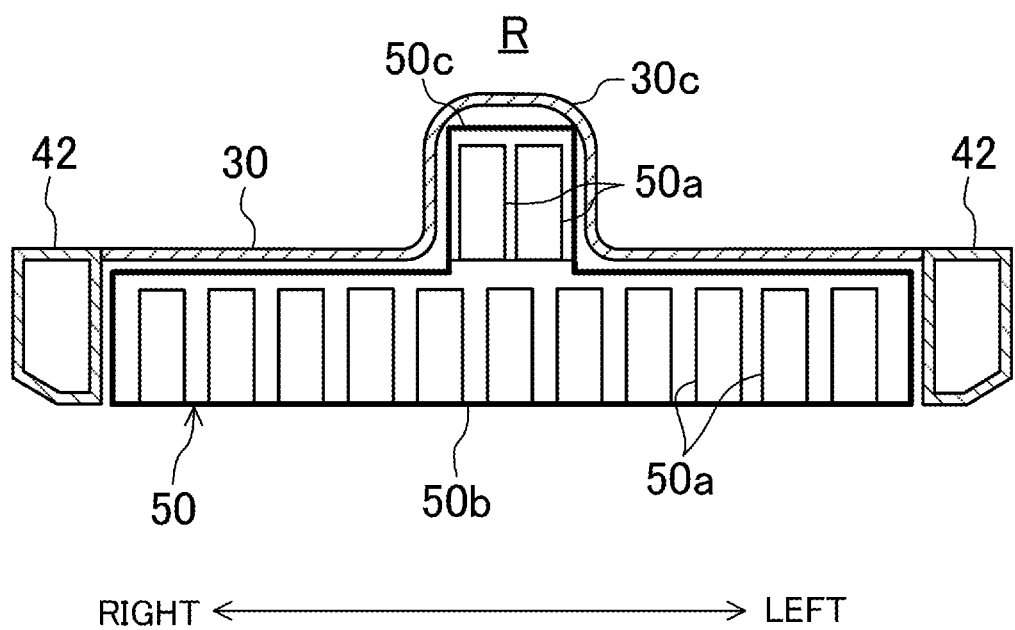
FIG. 3 is a cross-sectional view taken along line III-III in FIG. 2.

The vehicle body structure 1A of the motor vehicle 1 will be described more specifically. As indicated by broken lines in FIG. 1, at each of the right and left portions of the motor vehicle 1, there are a front door opening 40 to be opened or closed by the front door 5 and a rear door opening 41 to be opened or closed by the rear door 6. As shown in FIG. 3, the vehicle body structure 1A has a pair of right and left side sills 42 arranged so as to extend in the front-rear direction at both end portions of the floor panel 3 in the right-left direction. Further, as shown in FIG. 1 or FIG. 2, the vehicle body structure 1A also includes a pair of right and left hinge pillars 43 (only the left one is shown) arranged to extend in the up-down direction at both end portions of a front floor panel 30, which forms a front portion of the floor panel 3, in the right-left direction. A lower portion of the hinge pillar 43 is connected to the vicinity of a front portion of the side sill 42, and the hinge pillar 43 extends upward from such a portion. A rear portion of the hinge pillar 43 is formed so as to be positioned rearward toward a lower portion of the hinge pillar 43. That is, the dimension of the hinge pillar 43 in the front-rear direction is set so as to be longer toward the lower portion of the hinge pillar 43. A lower end portion of the hinge pillar 43 extends to a position lower than a lower surface of the front floor panel 30 described later.

A lower portion of a front pillar 44 is connected to an upper portion of the hinge pillar 43. The front pillar 44 extends while being inclined so as to be positioned rearward toward the upper side, and is connected to a front portion of the roof 4. Further, the vehicle body structure 1A includes a center pillar 45 extending upward from the a middle portion of the side sill 42 in the front-rear direction. The front door opening 40 is formed by a rear edge portion of the hinge pillar 43, a lower edge portion of the front pillar 44, an upper edge portion of the side sill 42, a front edge portion of the center pillar 45, and the roof 4. The front door 5 is supported by the hinge pillar 43, and the rear door 6 is supported by the center pillar 45. Note that the rear door 6 may be omitted, and in this case, the rear door opening 41 is also omitted.

The brake pedal B is swingably provided at the dash panel 7. That is, in the vehicle interior R on the right side of the dash panel 7, a pedal bracket 11 is attached to a portion facing the driver seat 8. The pedal bracket 11 is provided away upward from an upper surface of the floor panel 3. A spindle 11a extending in the right-left direction is provided at the pedal bracket 11. An upper end portion of the brake pedal B is pivotably supported on the spindle 11a.

The brake pedal B extends downward from the portion supported by the spindle 11a. A lower end portion of the brake pedal B is a portion to be stepped on by an occupant. A rear end portion of a rod B1 is coupled to the brake pedal B. A front end portion of the rod B1 is connected to an input of a brake booster apparatus 12. Note that the front end portion of the rod B1 may be coupled to a brake force generation apparatus other than the brake booster apparatus 12.

Note that the support structure of the brake pedal B is not limited to one described above and the brake pedal B may be a so-called organ pedal type brake pedal although not shown in the figure. In this case, a lower portion of the brake pedal is swingably supported on the floor panel 3 through a spindle extending in the right-left direction.

Figure 4:
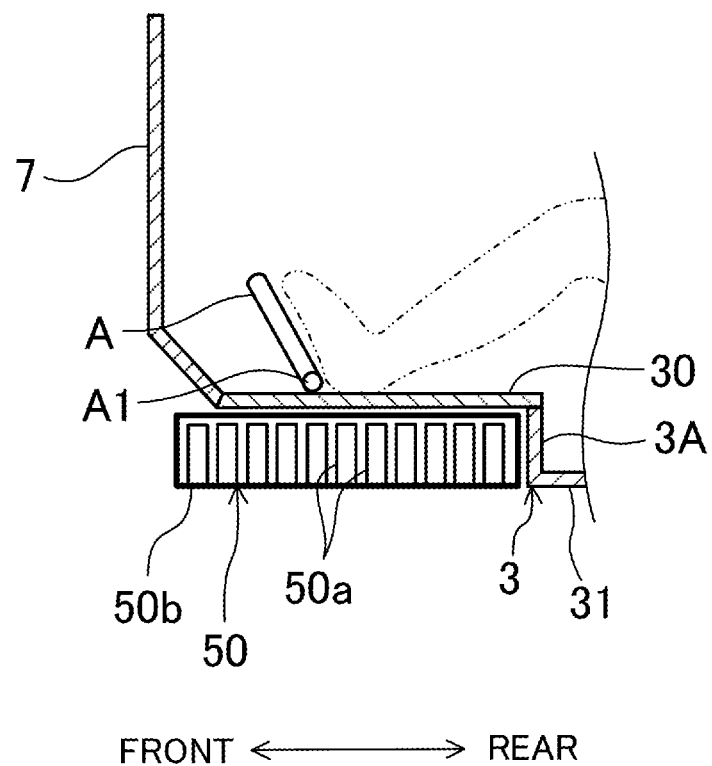
FIG. 4 is a partial cross-sectional view of the dash panel and the floor panel of the motor vehicle, showing the position of an accelerator pedal.

FIG. 4 is a cross-sectional view of the dash panel 7 and the floor pan 3, and shows the position of the accelerator pedal A. The accelerator pedal A is of a so-called organ pedal type, and a lower portion of the accelerator pedal A is swingably supported to the floor panel 3 through a spindle A1 extending in the right-left direction. Note that although not shown in the figure, the accelerator pedal A may be of a hanging type. In this case, an upper portion of the accelerator pedal A is swingably supported on the dash panel 7 via the spindle extending in the right-left direction. The motor vehicle 1 driven by the traction motor also includes a pedal to be operated upon acceleration, and such a pedal will be also referred to as an accelerator pedal in the present specification.

Although not shown in the figure, in a case where a manual transmission, whose gear ratio is changed by an occupant using an operation lever (not shown) provided in the vehicle interior R, is mounted, a pedal for operating a clutch is provided in the vehicle interior R. Normally, the accelerator pedal A is arranged at the rightmost position, the brake pedal B is arranged at the left of the accelerator pedal A, and a clutch pedal is arranged at the left of the brake pedal B.

Further, for example, in an instruction vehicle used for a motor vehicle driving course, an accelerator pedal and a brake pedal are also provided on a passenger seat side as in a driver seat side, although not shown in the figure. The present disclosure is also applicable to such an instruction vehicle.

Configuration of Floor Panel

Figure 5:
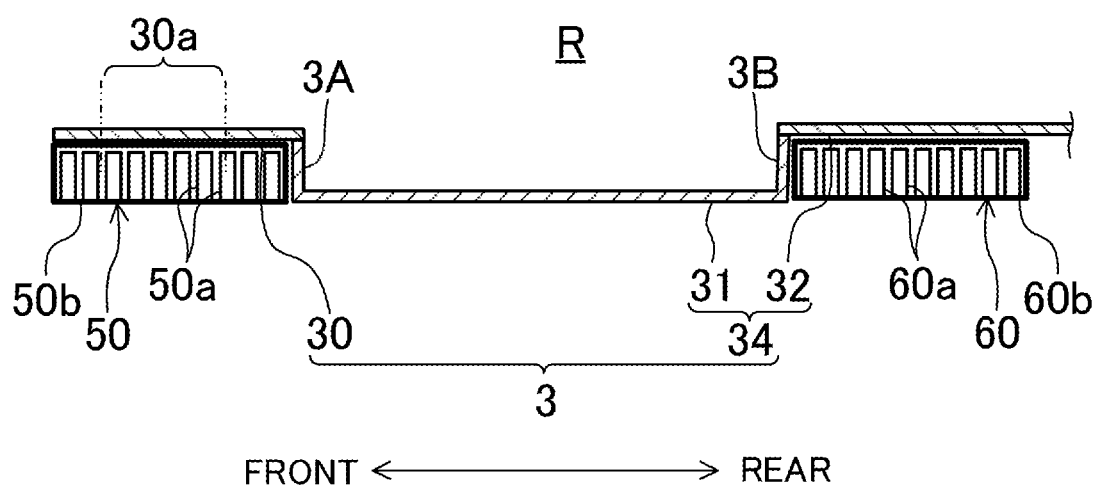
FIG. 5 is a cross-sectional view showing an exemplary structure of the floor panel.

As shown in FIG. 5, the floor panel 3 includes the front floor panel 30 and a seat-mounted floor panel 34. The front floor panel 30 and the seat-mounted floor panel 34 are formed by separate members, and are joined to each other to form the floor panel 3. Further, the seat-mounted floor panel 34 includes a first floor panel (a rear floor panel) 31 forming a front portion of the seat-mounted floor panel 34 and a second floor panel (a rear-seat floor panel) 32 forming a rear portion of the seat-mounted floor panel 34. The first floor panel 31 and the second floor panel 32 are separate members, and are joined to each other to form the seat-mounted floor panel 34.

As shown in FIG. 3, a floor tunnel portion 30c is formed at the front floor panel 30 and the first floor panel 31. The floor tunnel portion 30c may be formed in such a manner that center portions of the front floor panel 30 and the first floor panel 31 in the right-left direction bulge upward, and for example, may be formed so as to continuously extend in the front-rear direction from the front portion of the front floor panel 30 to the rear portion of the first floor panel 31.

The front floor panel 30 extends rearward from the lower end portion of the dash panel 7, and extends in the right-left direction. A heel rest portion 30a on which a heel of the pedal operator operating the brake pedal B and the accelerator pedal A is placed is provided at the front floor panel 30. The heel rest portion 30a is a portion where the heel of the occupant is naturally placed when the occupant operates the accelerator pedal A or the brake pedal B. This portion varies to some extent according to the physique, driving postures, etc. of the occupant, but is generally an area (region) shown in FIG. 5. That is, the heel rest portion 30a can be defined as a continuous region from a portion away rearward from a front end portion of the front floor panel 30 to a portion away forward from a rear end portion of the front floor panel 30, and can also be a middle portion of the front floor panel 30 in the front-rear direction.

As shown in FIG. 2, the second floor panel 32 is a member provided away rearward from the front floor panel 30 and fixed to the rear seat 10. The rear seat 10 includes a rear-seat cushion portion 10a forming a seat surface and a rear-seat seat back portion 10b forming a back rest portion. The rear-seat cushion portion 10a is fixed to an upper surface of the second floor panel 32.

Although the second floor panel 32 is continuously formed at least from a portion corresponding to a front end portion to a portion corresponding to a rear end portion of the rear-seat cushion portion 10a, the second floor panel 32 may be further extended rearward beyond the rear end portion of the rear-seat cushion portion 10a. In this case, a rear seat of a second row or a luggage compartment for placing luggage can be provided at the rear of the rear seat 10.

The first floor panel 31 extends from a rear portion of the front floor panel 30 to a front portion of the second floor panel 32. The first floor panel 31 is positioned lower than the front floor panel 30. That is, for example, the front floor panel 30 can be formed so as to extend substantially horizontally in the front-rear direction, and the first floor panel 31 can also be formed so as to extend substantially horizontally in the front-rear direction. In this case, since the front floor panel 30 is in a position higher than the first floor panel 31, the floor panel 3 includes a front plate portion 3A extending in the up-down direction from the rear portion of the front floor panel 30 to the front portion of the first floor panel 31. Since the front floor panel 30 and the first floor panel 31 are connected to each other through the front plate portion 3A, there is a step between the front floor panel 30 and the first floor panel 31.

Further, the second floor panel 32 may also be in such a shape that the second floor panel 32 extends substantially horizontally in the front-rear direction. The second floor panel 32 is positioned higher than the first floor panel 31. Thus, the floor panel 3 includes a rear plate portion 3B extending in the up-down direction from the front portion of the second floor panel 32 to the rear portion of the first floor panel 31. Since the second floor panel 32 and the first floor panel 31 are connected to each other through the rear plate portion 3B, there is a step between the second floor panel 32 and the first floor panel 31. Thus, the first floor panel 31 is positioned one step lower than the front floor panel 30 and the second floor panel 32. A difference in a height between the first floor panel 31 and each of the front floor panel 30 and the second floor panel 32 may be set to 5 cm or more, 10 cm or more, or 15 cm or more, for example. The front floor panel 30 and the second floor panel 32 may be at the same height, or the front floor panel 30 may be lower or higher than the second floor panel 32. Further, the front floor panel 30, the first floor panel 31, and the second floor panel 32 are not necessarily precisely horizontal, and may be inclined so as to be positioned downward toward the rear side. Further, only part of the front floor panel 30, the first floor panel 31, and the second floor panel 32 may be inclined, and the remaining part may be substantially horizontal. Further, the second floor panel 32 may be at the same height as that of the first floor panel 31.

The front plate portion 3A may be integrally formed with the front floor panel 30 or with the first floor panel 31. Alternatively, the front plate portion 3A may be formed separately from these floor panels 30, 31. The rear plate portion 3B may be integrally formed with the second floor panel 32 or with the first floor panel 31. Alternatively, the front plate portion 3A may be formed separately from these floor panels 31, 32. Further, the front plate portion 3A and the rear plate portion 3B may extend substantially vertically, or may be inclined or curved. For example, the front plate portion 3A may be inclined or curved so as to be positioned rearward toward the lower side, and the rear plate portion 3B may be inclined or curved so as to be positioned forward toward the lower side.

As shown in FIG. 2, the first floor panel 31 includes a first front-seat fixing portion (front seat fixing portion) 31a and a second front-seat fixing portion (rear seat fixing portion) 31b for fixing the front seat 8. The first front-seat fixing portion 31a is provided at the front of a center portion of the first floor panel 31 in the front-rear direction, and for example, includes a member fixed to the first floor panel 31 and formed long in the right-left direction. Similarly, the second front-seat fixing portion 31b also includes a member formed long in the right-left direction, and is provided a predetermined distance away rearward from the first front-seat fixing portion 31a. The configurations of the first front-seat fixing portion 31a and the second front-seat fixing portion 31b are not limited to the members as described above, and may be members formed in various shapes by plate members etc. Note that in this embodiment, the first front-seat fixing portion 31a is formed so as to be higher than the second front-seat fixing portion 31b. However, the heights of the first front-seat fixing portion 31a and the second front-seat fixing portion 31b may be the same as each other.

A rear-seat fixing portion 32a for fixing the rear seat 10 is provided at least at a front portion of the second floor panel 32. The rear-seat fixing portion 32a may be configured similarly to or differently from the front-seat fixing portions 31a, 31b. In a case where the second floor panel 32 and the first floor panel 31 are arranged at the same height, the front seat 8 and the rear seat 10 can be arranged at the same height.

Front Seat

The front seat 8 includes a front-seat cushion portion 8a, a front-seat seat back portion 8b, and a seat slide mechanism 8c configured to adjust the position of the front-seat cushion portion 8a in the front-rear direction. The front-seat cushion portion 8a is a portion forming a seat surface for a front seat occupant, and although not shown in the figure, includes, e.g., a seat frame, a cushion material, and a cover material. The front-seat seat back portion 8b is a portion forming a back rest portion for the front seat occupant, and although not shown in the figure, includes, e.g., a seat frame, a cushion material, and a cover material.

A lower portion of the front-seat seat back portion 8b is attached to a rear portion of the front-seat cushion portion 8a through a reclining mechanism 8d. The reclining mechanism 8d is typically well-known, and is a mechanism for fixing the front-seat seat back portion 8b at an optional inclination angle.

The seat slide mechanism 8c may be a typically well-known mechanism, and for example, includes a movable member 8e fixed to a lower portion of the front-seat cushion portion 8a and a rail 8f fixed to the first front-seat fixing portion 31a and the second front-seat fixing portion 31b on the first floor panel 31. The rail 8f is a member for guiding the front-seat cushion portion 8a in the front-rear direction, and extends in the front-rear direction. A front portion of the rail 8f is fixed to the first front-seat fixing portion 31a, and a rear portion of the rail 8f is fixed to the second front-seat fixing portion 31b. Since the first front-seat fixing portion 31a is higher than the second front-seat fixing portion 31b, the rail 8f is inclined so as to be positioned upward toward the front. The rail 8f may be substantially horizontal.

The movable member 8e is a member capable of moving relative to the rail 8f in the front-rear direction while being engaged with the rail 8f. The position of the movable member 8e with respect to the rail 8f in the front-rear direction can be an optional position within a predetermined range, and the movable member 8e can be locked to the rail 8f at such a position. Such a lock mechanism is also typically well-known, and for example, can be unlocked by, e.g., lever operation. Note that the seat slide mechanism 8c and the reclining mechanism 8d may be of an electric type using an electric motor.

Further, the height of the seat slide mechanism 8c can be set according to the height of the first floor panel 31, the height of the first front-seat fixing portion 31a, and the height of the second front-seat fixing portion 31b. In this embodiment, the height of the seat slide mechanism 8c is set such that the front floor panel 30 is at a position higher than the seat slide mechanism 8c when compared with the front floor panel 30.

Battery

As shown in FIG. 2, the motor vehicle 1 includes a front battery 50 and a rear battery 60 for supplying electric power to the traction motor. However, the rear battery 60 is not essential, and may be mounted as needed. The sizes of the front battery 50 and the rear battery 60 may be the same as or different from each other.

As also shown in FIG. 3, the front battery 50 is arranged below the front floor panel 30. The front battery 50 includes many cells 50a and a case 50b formed so as to extend across a wide area from a position immediately below the dash panel 7 to the vicinity of the front plate portion 3A of the floor panel 3. The case 50b extends from the vicinity of the right side sill 42 to the vicinity of the left side sill 42. The many cells 50a are housed in the case 50b from the front to the rear and from the right to the left. Further, at an upper portion of the case 50b, a bulge portion 50c is formed so as to bulge inward of the floor tunnel portion 30c, and the cells 50a are also housed in this bulge portion 50c. Note that the bulge portion 50c may be omitted.

The structure of the front battery 50 is not limited to one described above, and may be a so-called battery pack or a battery unit housing a secondary battery. Further, a battery storage space may be formed below the front floor panel 30, and cells may be housed in this battery storage space. In this case, the cells serve as the front battery 50. Further, the type of battery is not particularly limited, and may be, for example, a lithium-ion battery, an all-solid-state battery, or other types of secondary batteries. The structure, shape, etc. of the case 50b may be changed according to the type of battery. In the case 50b, a cooling unit, a heating unit, etc. (both not shown in the figure) for adjusting the temperatures of the cells 50a can be provided.

The case 50b can be fixed to, e.g., the front floor panel 30, the side sill 42, or a lower portion of the dash panel 7. A fixing structure of the case 50b is not particularly limited, and a fixing structure using a fastening member such as a bolt or a screw can be adopted. With this configuration, the front battery 50 becomes detachable, which leads to favorable workability upon replacement. The battery pack or the battery unit may be fixed in a similar manner.

The height of a lower surface of the front battery 50 may be the substantially same height as that of a lower surface of the first floor panel 31 or may be higher than the lower surface of the first floor panel 31 such that the minimum ground clearance of the motor vehicle 1 is not low.

The mounting position of the front battery 50 is set such that the hinge pillar 43 and part of the front battery 50 overlap with each other as viewed from the side of the vehicle body. Specifically, FIG. 2 shows a rear edge portion (a rear portion) of the hinge pillar 43 by a virtual line, and the lower side of the rear edge portion of the hinge pillar 43 overlaps with a middle portion of the front battery 50 in the front-rear direction as viewed from the side. Further, the lower end portion of the hinge pillar 43 overlaps at least with an upper portion of the front battery 50 as viewed from the side. Particularly, in this embodiment, the rear edge portion of the hinge pillar 43 is positioned rearward toward the lower side. Thus, an area where the hinge pillar 43 and the front battery 50 overlap with each other is wide.

The hinge pillar 43 is a highly-rigid member because the hinge pillar 43 supports the front door 5 in an openable/closable manner. A lower end portion of the hinge pillar 43 is positioned in the vicinity of the front floor panel 30. For example, when an impact load acts laterally from the motor vehicle 1 (e.g., upon lateral collision), the load is transmitted to the vehicle body through the highly-rigid hinge pillar 43. At this time, since the hinge pillar 43 and part of the front battery 50 overlap with each other as viewed from the side, the hinge pillar 43 can protect the front battery 50, and an input load on the front battery 50 can be reduced.

The rear battery 60 may be configured similarly to the front battery 50, and for example, may include cells 60a and a case 60b. The rear battery 60 is arranged below the second floor panel 32.

Note that in this embodiment, a portion of the rear floor panel 31 other than the floor tunnel portion is lower than the front floor panel 30. Thus, no battery is arranged below the portion of the rear floor panel 31 other than the floor tunnel portion. A battery may be arranged in the floor tunnel portion of the rear floor panel 31.

Posture of Front Seat Occupant and Pedal Operation

Figure 6:
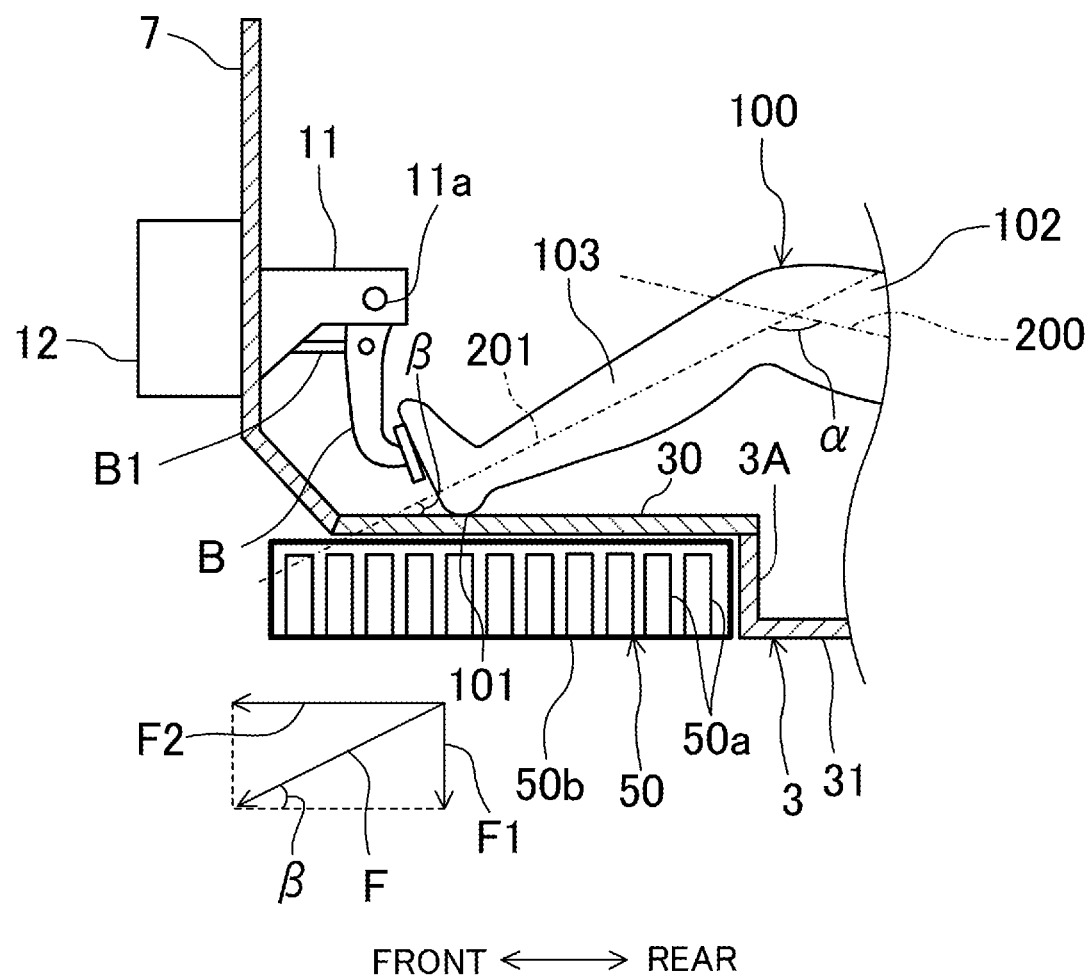
FIG. 6 is a view for describing pedal operation.

FIG. 6 is a view showing a lower limb 100 of a front seat occupant (a pedal operator) seated on the front seat 8, the floor panel 3, the dash panel 7, the brake pedal B, and the vicinity thereof. In this embodiment, the lower rear portion of the seat frame 8g of the front seat 8 is positioned lower than the upper surface of the front floor panel 30. Thus, the hip point of the pedal operator can be lowered. Lowering the hip point of the pedal operator means that the seating position of the pedal operator is lowered. This lowers the height of the center of gravity of the vehicle while the occupant is on-board.

Further, since the front floor panel 30 on which a heel 101 of the pedal operator is placed is positioned higher than the first floor panel 31, the heel 101 of the pedal operator is placed at a position higher as compared to a general operation posture. Such a layout leads to such a posture that an upper leg 102 and a lower leg 103 of the pedal operator are widely open. In FIG. 6, a reference numeral 200 indicates the center line of the upper leg 102 of the pedal operator whereas a reference numeral 201 indicates the center line of the lower leg 103, and a difference in a height between the front floor panel 30 and the first floor panel 31 is set such that an angle (an opening angle α between the upper leg 102 and the lower leg 103) between the center lines 200, 201 falls within a range of 125° to 150°.

Setting the height difference as described above results in a smaller angle (angle β between the center line 201 and the front floor panel 30) between the lower leg 103 and the front floor panel 30. This decreases component force, which is input to the heel 101 upon pedal operation, in the up-down direction, and improves the operability of the brake pedal B. More specifically, when the pedal operator steps on the brake pedal B, the heel 101 causes obliquely-downward force F to act on the front floor panel 30. When divided into vertical force and horizontal force, the force F is divided into force F1 and force F2. Since the angle β is small as described above, the component force F1, which is input from the heel 101, in the up-down direction is reduced. This allows, e.g., the quick and accurate operation of switching the pedal to be stepped on from the brake pedal B to the accelerator pedal A or from the accelerator pedal A to the brake pedal B. As a result, the operability of the pedals A, B is improved.

Comfort of Rear Seat Occupant

Note that this embodiment can improve the comfort of the rear seat occupant. As shown in FIG. 2, since the second floor panel 32 to which the rear seat 10 is attached is positioned higher than the first floor panel 31, the occupant on the rear seat 10 is seated at a relatively-high position, which improves the field of view. The feet of the rear seat occupant are placed on the first floor panel 31. Since the first floor panel 31 is positioned lower than the second floor panel 32, a wide foot space for the rear seat occupant is ensured particularly in the height direction.

Features and Advantages of Embodiment

As described above, according to this embodiment, the small angle β between the lower leg 103 of the pedal operator and the front floor panel 30 can improve the pedal operability. In addition, since the front battery 50 is arranged below the front floor panel 30, a space below the front floor panel 30 can be effectively utilized as a space for arranging the front battery 50 without being a dead space. Similarly, a space below the second floor panel 32 can be effectively utilized as a space for arranging the rear battery 60. As a result, the capacity for mounting the batteries 50, 60 can be further increased.

Further, since the seat fixing portions 31a, 31b are provided on the first floor panel 31 positioned lower than the front floor panel 30, the hip point of the pedal operator seated on the front seat 8 is lowered. This can achieve a sufficiently-small angle β between the lower leg 103 of the pedal operator and the front floor panel 30.

Other Embodiments

The above-described embodiments are merely examples in nature in all respects, and the scope of the present disclosure should not be interpreted in a limited manner. Further, variations and modifications of equivalents of the patent claims are intended to fall within the scope of the present disclosure.

Figure 7:
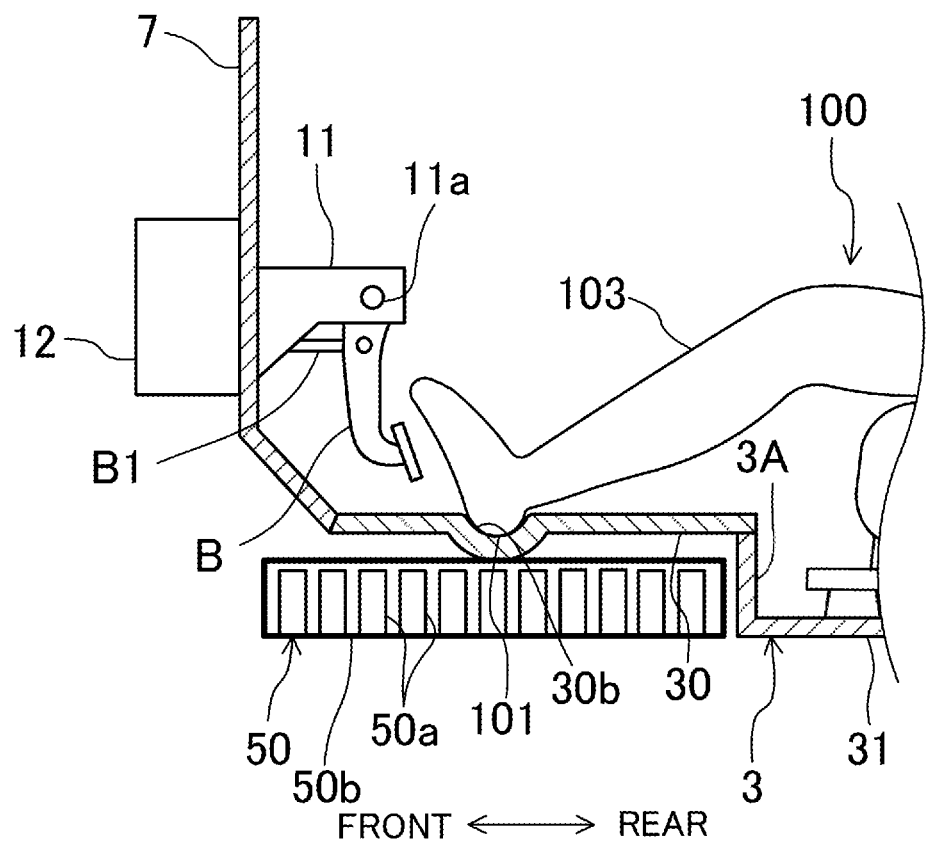
FIG. 7 is a view corresponding to FIG. 6, which relates to Variation 1 of the embodiment.

For example, in Variation 1 of the embodiment shown in FIG. 7, the front floor panel 30 has, at a portion thereof corresponding to the brake pedal B, a recessed portion 30b for placing the heel 101 of the pedal operator. It may only be required that the depth of the recessed portion 30b is set so as to house at least part of a heel portion of a shoe, and the depth can be 2 cm or more or 3 cm or more, for example. Since the pedal operability might be degraded if the recessed portion 30b is extremely deep, the depth may be 7 cm or less, for example. The width (the dimension in the right-left direction) of the recessed portion 30b can be, for example, 5 cm or more or 7 cm or more.

With the recessed portion 30b, the heel 101 is less likely to shift in the right-left direction. This can make the foot stable in the case of turning a toe in the right-left direction about the vicinity of the heel 101, such as the case of stepping on the accelerator pedal A after having stepped on the brake pedal B, for example. As a result, the pedal operability can be further improved by a synergy effect with the above-described advantage of the small angle β between the lower leg 103 of the pedal operator and the front floor panel 30.

Figure 8:
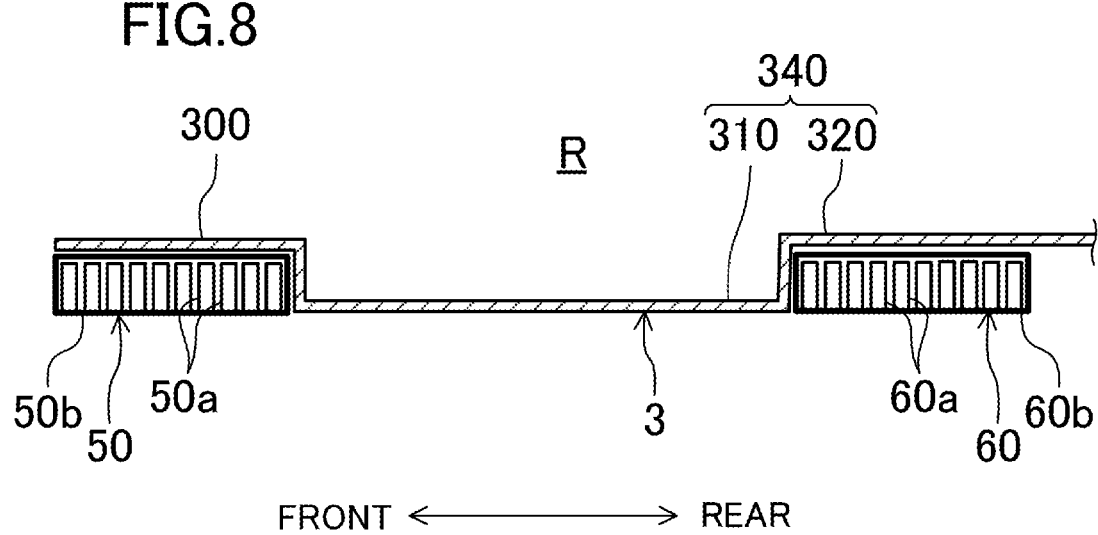
FIG. 8 is a view corresponding to FIG. 5, which relates to Variation 2 of the embodiment.

Further, for example, as in Variation 2 of the embodiment shown in FIG. 8, the floor panel 3 may be a single piece from the front portion to the rear portion. Specifically, the floor panel 3 of Variation 2 includes a front panel portion 300 for placing the heel of the pedal operator and a seat-mounted panel portion 340. The seat-mounted panel portion 340 is provided at the rear of the front panel portion 300, and includes a first panel portion (a rear panel portion) 310 to which at least the front seat 8 is attached and a second panel portion (a rear-seat panel portion) 320.

The front battery 50 can be arranged below the front panel portion 300, and the rear battery 60 can be arranged below the second panel portion 320. The front panel portion 300 is equivalent to the above-described front floor panel 30, the first panel portion 310 is equivalent to the above-described first floor panel 31, and the second panel portion 320 is equivalent to the above-described second floor panel 32. In Variation 2, features and advantages similar to those of the above-described embodiment can be also obtained. Alternatively, the front panel portion 300 and the first panel portion 310 may be integrally formed, and the second panel portion 320 may be a separate member. Alternatively, the second panel portion 320 and the first panel portion 310 may be integrally formed, and the front panel portion 300 may be a separate member.

As described above, the vehicle body structure of the present disclosure is applicable to a motor vehicle having a floor panel, for example.

The invention claimed is:

1. A vehicle body structure of a motor vehicle including a floor panel forming a floor surface of a vehicle interior in which a front seat is provided and a traction motor, the vehicle body structure comprising:
   a front floor panel for placing a heel of a pedal operator operating a pedal provided at the motor vehicle; and
   a rear floor panel provided at a rear of the front floor panel,
   the front floor panel being positioned higher than the rear floor panel,
   a front battery that supplies electric power to the traction motor being arranged below the front floor panel.

2. The vehicle body structure of claim 1, further comprising:
   a pair of right and left hinge pillars arranged to extend in an up-down direction at both end portions of the front floor panel in a vehicle width direction, wherein
   each hinge pillar and part of the front battery overlap with each other as viewed from a side.

3. The vehicle body structure of claim 2, wherein
   a rear portion of each hinge pillar is formed so as to be positioned rearward toward a lower side.

4. The vehicle body structure of claim 3, wherein
   the rear floor panel has a seat fixing portion for fixing the front seat.

5. The vehicle body structure according to claim 4, further comprising:
a rear-seat-side floor panel provided at a rear of the rear floor panel and fixed to a rear seat, wherein
the rear-seat-side floor panel is positioned higher than the rear floor panel, and a rear battery that supplies electric power to the traction motor is arranged below the rear-seat-side floor panel.

6. The vehicle body structure of claim 2, wherein
the rear floor panel has a seat fixing portion for fixing the front seat.

7. The vehicle body structure of claim 2, further comprising:
a rear-seat-side floor panel provided at a rear of the rear floor panel and fixed to a rear seat, wherein
the rear-seat-side floor panel is positioned higher than the rear floor panel, and
a rear battery that supplies electric power to the traction motor is arranged below the rear-seat-side floor panel.

8. The vehicle body structure of claim 3, further comprising:
a rear-seat-side floor panel provided at a rear of the rear floor panel and fixed to a rear seat, wherein
the rear-seat-side floor panel is positioned higher than the rear floor panel, and
a rear battery that supplies electric power to the traction motor is arranged below the rear-seat-side floor panel.

9. The vehicle body structure of claim 1, wherein
the rear floor panel has a seat fixing portion for fixing the front seat.

10. The vehicle body structure of claim 1, further comprising:
a rear-seat-side floor panel provided at a rear of the rear floor panel and fixed to a rear seat, wherein
the rear-seat-side floor panel is positioned higher than the rear floor panel, and
a rear battery that supplies electric power to the traction motor is arranged below the rear-seat-side floor panel.

11. A vehicle body structure of a motor vehicle comprising:
a floor panel forming a floor surface of a vehicle interior in which a front seat is provided; and
a traction motor,
the floor panel including
a front panel portion for placing a heel of a pedal operator operating a pedal provided at the motor vehicle, and
a rear panel portion provided at a rear of the front panel portion,
the front panel portion being positioned higher than the rear panel portion,
a front battery that supplies electric power to the traction motor being arranged below the front panel portion.

* * * * *